(12) United States Patent
Kalaydjian

(10) Patent No.: US 9,834,916 B1
(45) Date of Patent: Dec. 5, 2017

(54) DISPOSABLE FILTER FOR A SINK

(71) Applicant: Antranik Kalaydjian, Fort Lauderdale, FL (US)

(72) Inventor: Antranik Kalaydjian, Fort Lauderdale, FL (US)

(*) Notice: Subject to any disclaimer, the term of this patent is extended or adjusted under 35 U.S.C. 154(b) by 202 days.

(21) Appl. No.: 14/944,056

(22) Filed: Nov. 17, 2015

(51) Int. Cl.
| | |
|---|---|
| *E03C 1/264* | (2006.01) |
| *B01D 35/02* | (2006.01) |
| *C02F 1/00* | (2006.01) |
| *B01D 29/00* | (2006.01) |
| *B01D 35/28* | (2006.01) |

(52) U.S. Cl.
CPC .............. *E03C 1/264* (2013.01); *B01D 35/02* (2013.01); *B01D 29/0097* (2013.01); *B01D 35/28* (2013.01); *C02F 1/001* (2013.01); *C02F 2307/00* (2013.01)

(58) Field of Classification Search
CPC .... B01D 29/0097; B01D 35/02; B01D 35/08; B01D 35/28; C02F 1/001; C02F 2307/00; C02F 1/002; C02F 1/003; E03C 1/26; E03C 1/264; A47J 43/24
See application file for complete search history.

(56) References Cited

U.S. PATENT DOCUMENTS

| | | | | |
|---|---|---|---|---|
| 998,404 | A * | 7/1911 | Schaffer | E03C 1/264 |
| | | | | 4/289 |
| 4,351,073 | A | 9/1982 | Elsas | |
| 4,671,976 | A * | 6/1987 | Vidal | A47K 1/14 |
| | | | | 4/286 |
| 5,376,264 | A * | 12/1994 | Betancourt | B01D 29/01 |
| | | | | 210/166 |
| 7,685,654 | B1 | 3/2010 | Jones | |
| 7,951,292 | B1 | 5/2011 | De La Torre | |
| 2010/0213111 | A1 * | 8/2010 | Won | E03C 1/264 |
| | | | | 210/163 |
| 2014/0346100 | A1 * | 11/2014 | Harlan | E03C 1/264 |
| | | | | 210/163 |
| 2016/0066740 | A1 * | 3/2016 | Tremblay | A47J 31/08 |
| | | | | 206/499 |

\* cited by examiner

*Primary Examiner* — David C Mellon
*Assistant Examiner* — Liam Royce
(74) *Attorney, Agent, or Firm* — Stevenson IP, LLC

(57) ABSTRACT

A disposable filter for a sink including a substantially inverted disposed conical filter having a rounded conical apex and a continuous horizontally disposed circular bottom rim. A circular top rim is continuously disposed on a top surface of the bottom rim of the filter. A concave-shaped indentation is continuously disposed through each of an exterior edge of the bottom rim and an outer surface of the top rim. A plurality of tabs is attached to the outer surface of the top rim. An adhesive layer is disposed on a bottom surface of the bottom rim of the filter. The filter is removably disposed atop an exterior surface of a sink, with an exterior edge of the indentation disposed around an exterior surface of a base of a faucet.

5 Claims, 3 Drawing Sheets

US 9,834,916 B1

DISPOSABLE FILTER FOR A SINK

BACKGROUND OF THE INVENTION

Various types of sink liners are known in the prior art. However, what has been needed is a filter for a sink including a substantially inverted disposed conical filter having a rounded conical apex and a continuous horizontally disposed circular bottom rim. What has been further needed is a circular top rim continuously disposed on a top surface of the bottom rim of the filter and a concave-shaped indentation continuously disposed through each of an exterior edge of the bottom rim and an outer surface of the top rim. Lastly, what has been needed is a plurality of tabs attached to the outer surface of the top rim and an adhesive layer disposed on a bottom surface of the bottom rim of the filter. The filter is removably disposed atop an exterior surface of a sink, with an exterior edge of the indentation disposed around an exterior surface of a base of a faucet. The disposable filter for a sink is thus structured to be removably disposed atop a sink in order to catch debris, including toenail and fingernail clippings, beard trimmings, and hair, that would ordinarily flow into a sink drain and potentially clog a sink pipe. The adhesive layer disposed on the bottom rim of the filter maintains the position of the filter within the sink while in use.

FIELD OF THE INVENTION

The present invention relates to sink liners, and more particularly, to a disposable filter for a sink.

SUMMARY OF THE INVENTION

The general purpose of the present disposable filter for a sink, described subsequently in greater detail, is to provide a disposable filter for a sink which has many novel features that result in a disposable filter for a sink which is not anticipated, rendered obvious, suggested, or even implied by prior art, either alone or in combination thereof.

To accomplish this, the present disposable filter for a sink includes a substantially inverted disposable conical filter having a rounded conical apex and a continuous horizontally disposed circular bottom rim. The filter is optionally unbleached crepe paper. The bottom rim has a top surface, a bottom surface, an interior edge, and an exterior edge. A circular top rim is continuously disposed on the top surface of the bottom rim of the filter. The top rim has a continuous inner surface, an outer surface, an upper surface, and a lower surface. A concave-shaped indentation is continuously disposed through each of the exterior edge of the bottom rim of the filter and the outer surface of the top rim. A plurality of tabs is attached to the outer surface of the top rim. One of the plurality of tabs is disposed proximal the indentation. Each of the plurality of tabs is optionally substantially semi-circular for ease of use, and the plurality of tabs is optionally three. Three substantially semi-circular tabs spaced around the outer surface of the top rim provides an easy method for a user to remove the filter from an exterior surface of a sink.

The disposable filter for a sink further includes an adhesive layer continuously disposed on the bottom surface of the bottom rim of the filter from proximal a right end of the indentation to proximal a left end of the indentation. A covering is removably attachable to the adhesive layer. The filter is removably disposed atop the exterior surface of the sink. An exterior edge of the indentation is disposed around an external surface of a base of a faucet when the filter is disposed atop the exterior surface of the sink. The indentation thus provides the filter with an improved fit around the exterior surface of the sink.

Thus has been broadly outlined the more important features of the present disposable filter for a sink so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
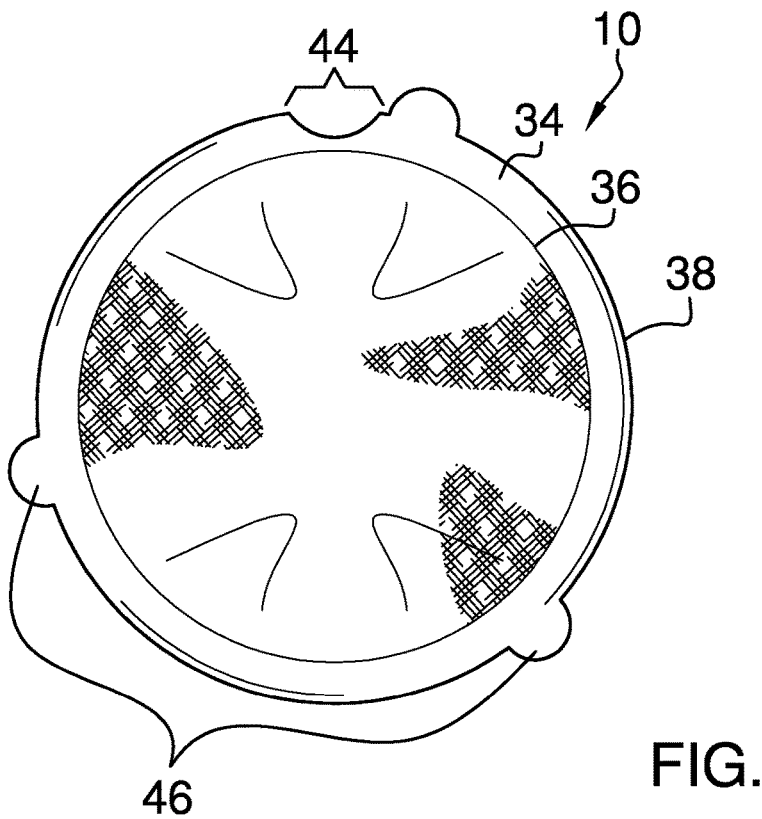
FIG. 1 is a top plan view.
Figure 2:
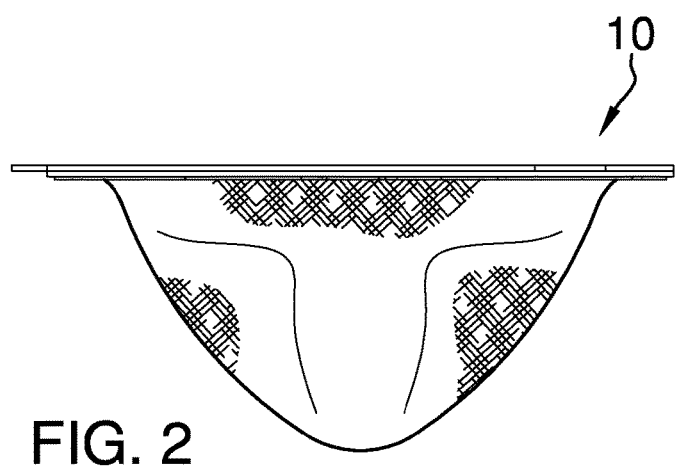
FIG. 2 is a front elevation view.
Figure 3:
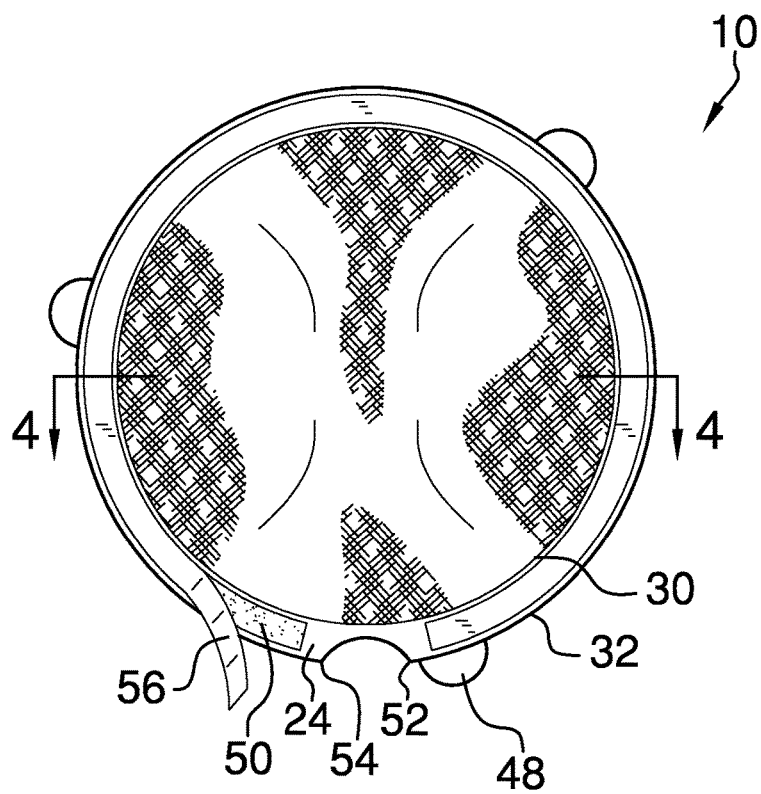
FIG. 3 is a bottom plan view.
Figure 4:
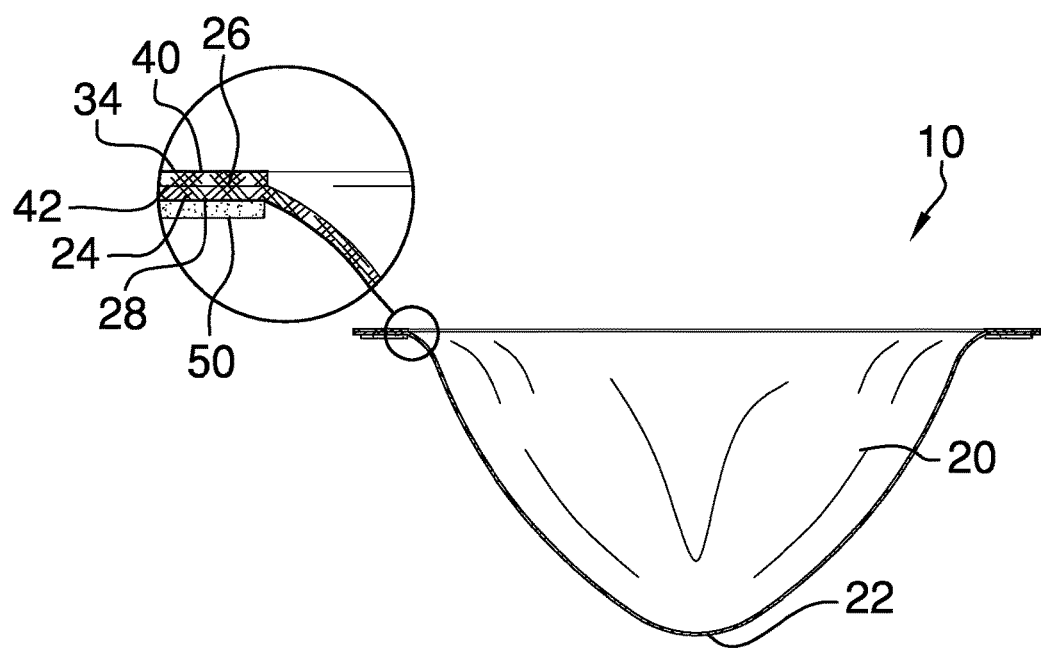
FIG. 4 is a detail view.

With reference now to the drawings, and in particular FIGS. 1 through 5 thereof, an example of the instant disposable filter for a sink employing the principles and concepts of the present disposable filter for a sink and generally designated by the reference number 10 will be described.

Referring to FIGS. 1 through 5, the present disposable filter for a sink 10 is illustrated. The disposable filter for a sink 10 includes a substantially inverted disposable conical filter 20 having a rounded conical apex 22 and a continuous horizontally disposed circular bottom rim 24. The bottom rim 24 has a top surface 26, a bottom surface 28, an interior edge 30, and an exterior edge 32. A circular top rim 34 is continuously disposed on the top surface 26 of the bottom rim 24 of the filter 20. The top rim 34 has a continuous inner surface 36, an outer surface 38, an upper surface 40, and a lower surface 42. A concave-shaped indentation 44 is continuously disposed through each of the exterior edge 32 of the bottom rim 24 of the filter 20 and the outer surface 38 of the top rim 34. A plurality of tabs 46 is attached to the outer surface 38 of the top rim 34. One of the plurality of tabs 48 is disposed proximal the indentation 44. Each of the plurality of tabs 46 is optionally substantially semi-circular, and the plurality of tabs 46 is optionally three.

Figure 5:
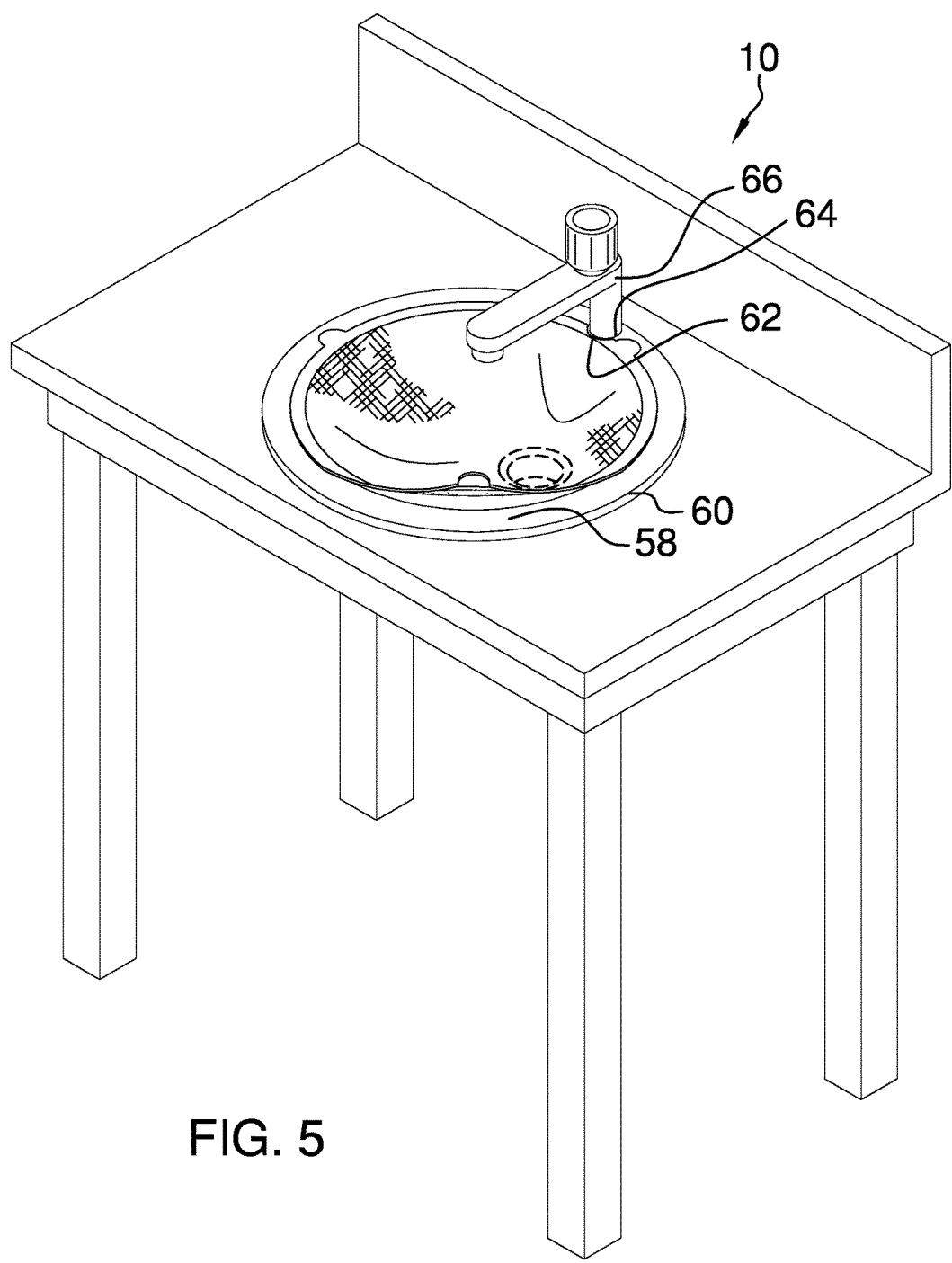
FIG. 5 is an in use view.

The disposable filter for a sink 10 further includes an adhesive layer 50 continuously disposed on the bottom surface 28 of the bottom rim 24 of the filter 20 from proximal a right end 52 of the indentation 44 to proximal a left end 54 of the indentation 44. A covering 56 is removably attachable to the adhesive layer 50. As best shown in FIG. 5, the filter 20 is removably disposed atop an exterior surface 58 of a sink 60. An exterior edge 62 of the indentation 44 is disposed around an external surface of a base 64 of a faucet 66 when the filter 20 is disposed atop the exterior surface 58 of the sink 60.

What is claimed is:
1. A disposable filter for a sink comprising:
   a substantially inverted disposable conical filter having a rounded conical apex and a continuous horizontally disposed circular bottom rim, the bottom rim having a top surface, a bottom surface, an interior edge, and an exterior edge;
   a circular top rim continuously disposed on the top surface of the filter bottom rim, the top rim having a continuous inner surface, an outer surface, an upper surface, and a lower surface;

a concave-shaped indentation continuously disposed through each of the exterior edge of the filter bottom rim and the top rim outer surface;

a plurality of tabs attached to the outer surface of the top rim, wherein one of the plurality of tabs is disposed proximal the indentation;

an adhesive layer continuously disposed on the bottom surface of the filter bottom rim from proximal a right end of the indentation to proximal a left end of the indentation; and a covering removably attachable to the adhesive layer;

wherein the filter is removably disposed atop an exterior surface of a sink;

wherein an exterior edge of the indentation is disposed around an external surface of a base of a faucet when the filter is disposed atop the exterior surface of the sink.

2. The disposable filter for a sink of claim 1 wherein each of the plurality of tabs is substantially semi-circular.

3. The disposable filter for a sink of claim 1 wherein the plurality of tabs is three.

4. The disposable filter for a sink of claim 1 wherein the filter is unbleached crepe paper.

5. A disposable filter for a sink comprising:

a substantially inverted disposable conical filter having a rounded conical apex and a continuous horizontally disposed circular bottom rim, the bottom rim having a top surface, a bottom surface, an interior edge, and an exterior edge;

a circular top rim continuously disposed on the top surface of the filter bottom rim, the top rim having a continuous inner surface, an outer surface, an upper surface, and a lower surface;

a concave-shaped indentation continuously disposed through each of the exterior edge of the filter bottom rim and the top rim outer surface;

a plurality of substantially semi-circular tabs attached to the outer surface of the top rim, wherein one of the plurality of tabs is disposed proximal the indentation;

wherein the plurality is three;

an adhesive layer continuously disposed on the bottom surface of the filter bottom rim from proximal a right end of the indentation to proximal a left end of the indentation; and a covering removably attachable to the adhesive layer;

wherein the filter is removably disposed atop an exterior surface of a sink;

wherein an exterior edge of the indentation is disposed around an external surface of a base of a faucet when the filter is disposed atop the exterior surface of the sink.

\* \* \* \* \*